US010585804B2

(12) United States Patent
Avudaiyappan et al.

(10) Patent No.: US 10,585,804 B2
(45) Date of Patent: *Mar. 10, 2020

(54) SYSTEMS AND METHODS FOR NON-BLOCKING IMPLEMENTATION OF CACHE FLUSH INSTRUCTIONS (71) Applicant: Intel Corporation, Santa Clara, CA (US)

(72) Inventors: Karthikeyan Avudaiyappan, Sunnyvale, CA (US); Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/806,178

(22) Filed: Nov. 7, 2017

(65) Prior Publication Data

US 2018/0060243 A1 Mar. 1, 2018

Related U.S. Application Data (63) Continuation of application No. 15/003,486, filed on Jan. 21, 2016, now Pat. No. 9,842,056, which is a (Continued)

(51) Int. Cl.
G06F 12/00 (2006.01)
G06F 12/0891 (2016.01)
(Continued)

(52) U.S. Cl.
CPC ...... G06F 12/0891 (2013.01); G06F 12/0804 (2013.01); G06F 12/0811 (2013.01);
(Continued)

(58) Field of Classification Search
CPC ............ G06F 12/0891; G06F 12/0804; G06F 12/0811; G06F 12/0837; G06F 12/0897; G06F 2212/1024
See application file for complete search history.

(56) References Cited

U.S. PATENT DOCUMENTS 4,075,704 A 2/1978 O'Leary
4,245,344 A 1/1981 Richter
(Continued)

FOREIGN PATENT DOCUMENTS

CN 1305150 A 7/2001
EP 0596636 A2 5/1994
(Continued)

OTHER PUBLICATIONS

Barham, et al., "Xen and the Art of Virtualization," Proceedings of the ACM Symposium on Operating Systems Principles, XP002298786, Oct. 2003, pp. 164-177.
(Continued)

Primary Examiner — Prasith Thammavong
(74) Attorney, Agent, or Firm — NDWE, LLP (57) ABSTRACT Systems and methods for non-blocking implementation of cache flush instructions are disclosed. As a part of a method, data is accessed that is received in a write-back data holding buffer from a cache flushing operation, the data is flagged with a processor identifier and a serialization flag, and responsive to the flagging, the cache is notified that the cache flush is completed. Subsequent to the notifying, access is provided to data then present in the write-back data holding buffer to determine if data then present in the write-back data holding buffer is flagged.

20 Claims, 6 Drawing Sheets

Related U.S. Application Data continuation of application No. 13/649,532, filed on Oct. 11, 2012, now Pat. No. 9,678,882.

(51) Int. Cl.
| | |
|---|---|
| *G06F 12/0811* | (2016.01) |
| *G06F 12/0804* | (2016.01) |
| G06F 12/0837 | (2016.01) |
| G06F 12/0897 | (2016.01) |

(52) U.S. Cl.
CPC ...... *G06F 12/0837* (2013.01); *G06F 12/0897* (2013.01); *G06F 2212/1024* (2013.01)

(56) References Cited

U.S. PATENT DOCUMENTS

| | | |
|---|---|---|
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,816,991 A | 3/1989 | Watanabe et al. |
| 4,920,477 A | 4/1990 | Colwell et al. |
| 5,294,897 A | 3/1994 | Notani et al. |
| 5,317,705 A | 5/1994 | Gannon et al. |
| 5,317,754 A | 5/1994 | Blandy et al. |
| 5,548,742 A | 8/1996 | Wang et al. |
| 5,559,986 A | 9/1996 | Alpert et al. |
| 5,574,878 A | 11/1996 | Onodera et al. |
| 5,634,068 A | 5/1997 | Nishtala et al. |
| 5,752,260 A | 5/1998 | Liu |
| 5,754,818 A | 5/1998 | Mohamed |
| 5,758,166 A | 5/1998 | Ajanovic |
| 5,787,243 A | 7/1998 | Stiffler |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,809,524 A * | 9/1998 | Singh .................... G06F 12/123 711/118 |
| 5,813,031 A | 9/1998 | Chou et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,903,750 A | 5/1999 | Yeh et al. |
| 5,905,509 A | 5/1999 | Jones et al. |
| 5,918,251 A | 6/1999 | Yamada et al. |
| 5,956,753 A | 9/1999 | Glew et al. |
| 5,974,506 A | 10/1999 | Sicola et al. |
| 6,016,533 A | 1/2000 | Tran |
| 6,073,230 A | 6/2000 | Pickett et al. |
| 6,075,938 A | 6/2000 | Bugnion et al. |
| 6,088,780 A | 7/2000 | Yamada et al. |
| 6,092,172 A | 7/2000 | Nishimoto et al. |
| 6,101,577 A | 8/2000 | Tran |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,205,545 B1 | 3/2001 | Shah et al. |
| 6,212,613 B1 | 4/2001 | Belair |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,272,662 B1 | 8/2001 | Jadav et al. |
| 6,275,917 B1 | 8/2001 | Okada |
| 6,321,298 B1 | 11/2001 | Hubis |
| 6,332,189 B1 | 12/2001 | Baweja et al. |
| 6,341,324 B1 | 1/2002 | Caulk, Jr. et al. |
| 6,437,789 B1 | 8/2002 | Tidwell et al. |
| 6,442,700 B1 | 8/2002 | Cooper |
| 6,449,671 B1 | 9/2002 | Patkar et al. |
| 6,457,120 B1 | 9/2002 | Sinharoy |
| 6,557,083 B1 | 4/2003 | Sperber et al. |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,658,549 B2 | 12/2003 | Wilson et al. |
| 6,681,395 B1 | 1/2004 | Nishi |
| 6,907,600 B2 | 6/2005 | Neiger et al. |
| 6,912,644 B1 | 6/2005 | O'Connor et al. |
| 7,007,108 B2 | 2/2006 | Emerson et al. |
| 7,111,145 B1 | 9/2006 | Chen et al. |
| 7,143,273 B2 | 11/2006 | Miller et al. |
| 7,149,872 B2 | 12/2006 | Rozas et al. |
| 7,213,106 B1 | 5/2007 | Koster et al. |
| 7,278,030 B1 | 10/2007 | Chen et al. |
| 7,380,096 B1 | 5/2008 | Rozas et al. |
| 7,406,581 B2 | 7/2008 | Southwell et al. |
| 7,546,420 B1 | 6/2009 | Shar et al. |
| 7,680,988 B1 | 3/2010 | Nickolls et al. |
| 7,783,868 B2 | 8/2010 | Ukai |
| 7,856,530 B1 | 12/2010 | Mu |
| 7,913,058 B2 | 3/2011 | Rozas et al. |
| 8,145,844 B2 | 3/2012 | Bruce |
| 8,239,656 B2 | 8/2012 | Rozas et al. |
| 8,301,847 B2 | 10/2012 | Dantzig et al. |
| 8,522,253 B1 | 8/2013 | Rozas et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 2001/0049782 A1 | 12/2001 | Hsu et al. |
| 2002/0069326 A1 | 6/2002 | Richardson et al. |
| 2002/0082824 A1 | 6/2002 | Neiger et al. |
| 2002/0099913 A1 | 7/2002 | Steely et al. |
| 2003/0028737 A1 | 2/2003 | Kaiya et al. |
| 2003/0065887 A1 | 4/2003 | Maiyuran et al. |
| 2003/0088752 A1 | 5/2003 | Harman |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0093483 A1 | 5/2004 | Nguyen et al. |
| 2004/0117441 A1 | 6/2004 | Liu et al. |
| 2004/0117593 A1 | 6/2004 | Uhlig et al. |
| 2004/0117594 A1 | 6/2004 | Vanderspek |
| 2004/0143727 A1 | 7/2004 | McDonald |
| 2004/0193857 A1 | 9/2004 | Miller et al. |
| 2004/0205296 A1 | 10/2004 | Bearden |
| 2004/0215886 A1 | 10/2004 | Cargnoni et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0027972 A1 * | 2/2005 | Harrington ........... G06F 9/4812 712/233 |
| 2005/0044320 A1 | 2/2005 | Olukotun |
| 2005/0060457 A1 | 3/2005 | Olukotun |
| 2005/0108480 A1 | 5/2005 | Correale, Jr. et al. |
| 2005/0154867 A1 | 7/2005 | Dewitt et al. |
| 2006/0004964 A1 | 1/2006 | Conti et al. |
| 2006/0015689 A1 * | 1/2006 | Okawa ................ G06F 12/0859 711/143 |
| 2006/0026381 A1 | 2/2006 | Doi et al. |
| 2006/0190707 A1 | 8/2006 | McIlvaine et al. |
| 2006/0236074 A1 | 10/2006 | Williamson et al. |
| 2006/0277365 A1 | 12/2006 | Pong |
| 2008/0077813 A1 | 3/2008 | Keller et al. |
| 2008/0091880 A1 | 4/2008 | Vishin |
| 2008/0126771 A1 | 5/2008 | Chen et al. |
| 2008/0195844 A1 | 8/2008 | Shen et al. |
| 2008/0215865 A1 | 9/2008 | Hino et al. |
| 2008/0235500 A1 | 9/2008 | Davis et al. |
| 2008/0270758 A1 | 10/2008 | Ozer et al. |

(56) References Cited

U.S. PATENT DOCUMENTS

| | | |
|---|---|---|
| 2008/0270774 A1 | 10/2008 | Singh et al. |
| 2008/0282037 A1 | 11/2008 | Kusachi et al. |
| 2009/0138659 A1 | 5/2009 | Lauterbach |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0172344 A1 | 7/2009 | Grochowski et al. |
| 2009/0287912 A1 | 11/2009 | Sendag |
| 2010/0138607 A1 | 6/2010 | Hughes et al. |
| 2010/0169578 A1 | 7/2010 | Nychka et al. |
| 2010/0169611 A1 | 7/2010 | Chou et al. |
| 2010/0211746 A1 | 8/2010 | Tsukishiro |
| 2011/0010521 A1 | 1/2011 | Wang et al. |
| 2011/0082980 A1 | 4/2011 | Gschwind et al. |
| 2011/0082983 A1 | 4/2011 | Koktan |
| 2011/0153955 A1 | 6/2011 | Herrenschmidt |
| 2012/0005462 A1 | 1/2012 | Hall et al. |
| 2012/0042126 A1 | 2/2012 | Krick et al. |
| 2012/0239857 A1* | 9/2012 | Jibbe ............... G06F 12/0246 711/103 |
| 2013/0019047 A1 | 1/2013 | Podvalny et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0212321 A1 | 8/2013 | Talagala et al. |
| 2013/0238874 A1 | 9/2013 | Avudaiyappan |
| 2013/0304991 A1 | 11/2013 | Boettcher et al. |
| 2013/0311759 A1 | 11/2013 | Abdallah et al. |
| 2013/0332660 A1* | 12/2013 | Talagala ............ G06F 12/0246 711/103 |
| 2013/0346699 A1* | 12/2013 | Walker .............. G06F 12/0893 711/128 |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0156947 A1 | 6/2014 | Avudaiyappan |
| 2014/0281242 A1 | 9/2014 | Abdallah et al. |
| 2014/0365736 A1* | 12/2014 | Simionescu ........ G06F 3/0613 711/145 |
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan |
| 2016/0048469 A1* | 2/2016 | Waugh .............. G06F 13/364 710/241 |

FOREIGN PATENT DOCUMENTS

| | | |
|---|---|---|
| EP | 0706133 A2 | 4/1996 |
| GB | 2343270 A | 5/2000 |
| TW | 200707284 | 3/1995 |
| TW | 539996 B | 7/2003 |
| TW | 200401187 A | 1/2004 |
| TW | 591530 B | 6/2004 |
| TW | I233545 B | 6/2005 |
| TW | I281121 B | 5/2007 |
| WO | 0125921 A1 | 4/2001 |

OTHER PUBLICATIONS

Cooperman, "Cache Basics," Winter 2003, downloaded from http://www.ccs.neu.edu/course/com3200/parent/NOTES/cache-basics.html on Sep. 24, 2015, 3 pages. (no publication month available).

Garmany, J., "The Power of Indexing: Oracle Tips by Burleson Consulting," Burleson Enterprises, Inc., archived on Mar. 9, 2009, retrieved Sep. 17, 2015 via Internet: web.archive.org/web/20090309201136/http://dba-oracle.com/t_indexing_power.htm, 7 pages.

Jacobson, et al., "Path-based Next Trace Prediction," MICRO 30—Proceedings of the 30th Annual IEEE/ACM International Symposium on Microarchitecture, Dec. 1-3, 1997, IEEE Computer Society, Washington, D.C., 1997, pp. 14-23.

Nanda, et al., "The Misprediction Recovery Cache," International Journal of Parallel Programming—Special issue: MICRO-29, 29th annual IEEE/ACM international symposium on microarchitecture, Plenum Press, New York, NY, Aug. 1998, vol. 26 (4), pp. 383-415.

Non-Final Office Action from U.S. Appl. No. 13/649,532, dated Apr. 7, 2015, 16 pages.

Non-Final Office Action from U.S. Appl. No. 15/003,486, dated Apr. 21, 2017, 8 pages.

Notice of Allowance from U.S. Appl. No. 13/649,532, dated Feb. 10, 2017, 13 pages.

Notice of Allowance from U.S. Appl. No. 13/649,532, dated Feb. 29, 2016, 15 pages.

Notice of Allowance from U.S. Appl. No. 13/649,532, dated May 18, 2016, 9 pages.

Notice of Allowance from U.S. Appl. No. 13/649,532, dated Oct. 22, 2015, 13 pages.

Notice of Allowance from U.S. Appl. No. 13/649,532, dated Sep. 21, 2016, 7 pages.

Notice of Allowance from U.S. Appl. No. 15/003,486, dated Aug. 21, 2017, 33 pages.

Rotenberg, et al., "Trace Cache: a Low Latency Approach to High Bandwidth Instruction Fetching," MICRO 29—Proceedings of the 29th annual ACM/IEEE international symposium on Microarchitecture, IEEE Computer Society, Apr. 11, 1996, 48 pages.

Wallace, et al., "Multiple Branch and Block Prediction," Third International symposium on High-Performance Computer Architecture, IEEE, Feb. 1997, pp. 94-103.

Ye, et al., "A New Recovery Mechanism in Superscalar Microprocessors by Recovering Critical Misprediction," IEICE Transactions on Fundamentals of Electronics, Communications and Computer Sciences, The Institute of Electronics, Information and Communication Engineers, Dec. 1, 2011, vol. E94-A (12), pp. 2639-2648.

Yeh, et al., "Increasing the Instruction Fetch Rate via Multiple Branch Prediction and a Branch Address Cache," ICS 93, Proceedings of the 7th International Conference on Supercomputing, ACM, New York, NY, Jul. 19-23, 1993, pp. 57-76.

\* cited by examiner

SYSTEMS AND METHODS FOR NON-BLOCKING IMPLEMENTATION OF CACHE FLUSH INSTRUCTIONS

CROSS-REFERENCE TO RELATED APPLICATIONS

This application is a continuation of Ser. No. 15/003,486, filed Jan. 21, 2016 (now U.S. Pat. No. 9,842,056, issued Dec. 12, 2017), which is a continuation of U.S. application Ser. No. 13/649,532, filed Oct. 11, 2012 (now U.S. Pat. No. 9,678,882, issued Jun. 13, 2017), which is hereby incorporated by reference.

TECHNICAL FIELD

Modern microprocessors operate much faster than associated memories where program data is kept. In particular, main memories operate much slower than do modern microprocessors. Because of this, program data may not be able to be read fast enough to keep a microprocessor busy. Moreover, the performance gap creates a bottleneck that is the source of latency. Cache memory is used to help ameliorate the performance gap that exists between processors and main memory. Cache memory is memory that is smaller in storage capacity than main memory, but is memory that can be accessed much more quickly than can main memory.

As such, cache memory is used by the central processing unit of a computer to reduce the time that it takes to access data and instructions associated with the execution of an application. Cache memory is small, high speed memory, usually static RAM, which stores copies of data and instructions accessed from the most recently used main memory locations. As long as data and instructions are accessed from cached memory locations, the latency associated with data and instruction accesses is that of cache memory accesses as opposed to being that of main memory accesses, which are much slower. Cache memory improves latency by decreasing the time that it takes to move information to and from the processor.

Cache flushing is the intentional removal of information from a cache. Individual modified or dirty cache lines can be evicted from a cache and written into main memory in an operation called a write-back. The write-back updates the version of the cache line that is stored in main memory. A writeback may result from actions in either hardware or software. If the write-back was initiated by software, as a result of the execution of a cache flush instruction, after the processor finishes the write-backs, it then generates a special bus cycle called a flush acknowledge cycle.

In conventional processors, when a flush of data from a cache is requested, the processor is stalled until the flush of data to main memory or the next level of cache is completed. As such, latency that is attributable to the period during which the processor waits for the write backs to complete is incurred. Accordingly, some conventional processors exhibit an unsatisfactory latency that is attributable to the waiting period that is associated with writebacks to main memory (or other locations).

SUMMARY

Conventional processors exhibit an unsatisfactory latency that is attributable to the waiting period that is associated with data write-backs. A method for non-blocking implementation of cache flush instructions is disclosed that addresses these shortcomings. However, the claimed embodiments are not limited to implementations that address any or all of the aforementioned shortcomings. As a part of a method, data is accessed that is received in a write-back data holding buffer from a cache flushing operation, the data is flagged with a processor identifier and a serialization flag, and responsive to the flagging, the processor executing the cache flush instruction is prematurely/expediently notified that the cache flush operation is completed. Subsequent to such notification, access is provided to data then present in the write-back data holding buffer to determine if data then present in the writeback data holding buffer is flagged. The aforementioned methodology does not require a waiting period during which the processor waits (e.g., is stalled) for write-backs to complete. Accordingly, the aforementioned methodology avoids unsatisfactory latency that is attributable to the waiting period that is associated with data flushes in conventional processors.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "accessing" or "flagging" or "notifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1A:
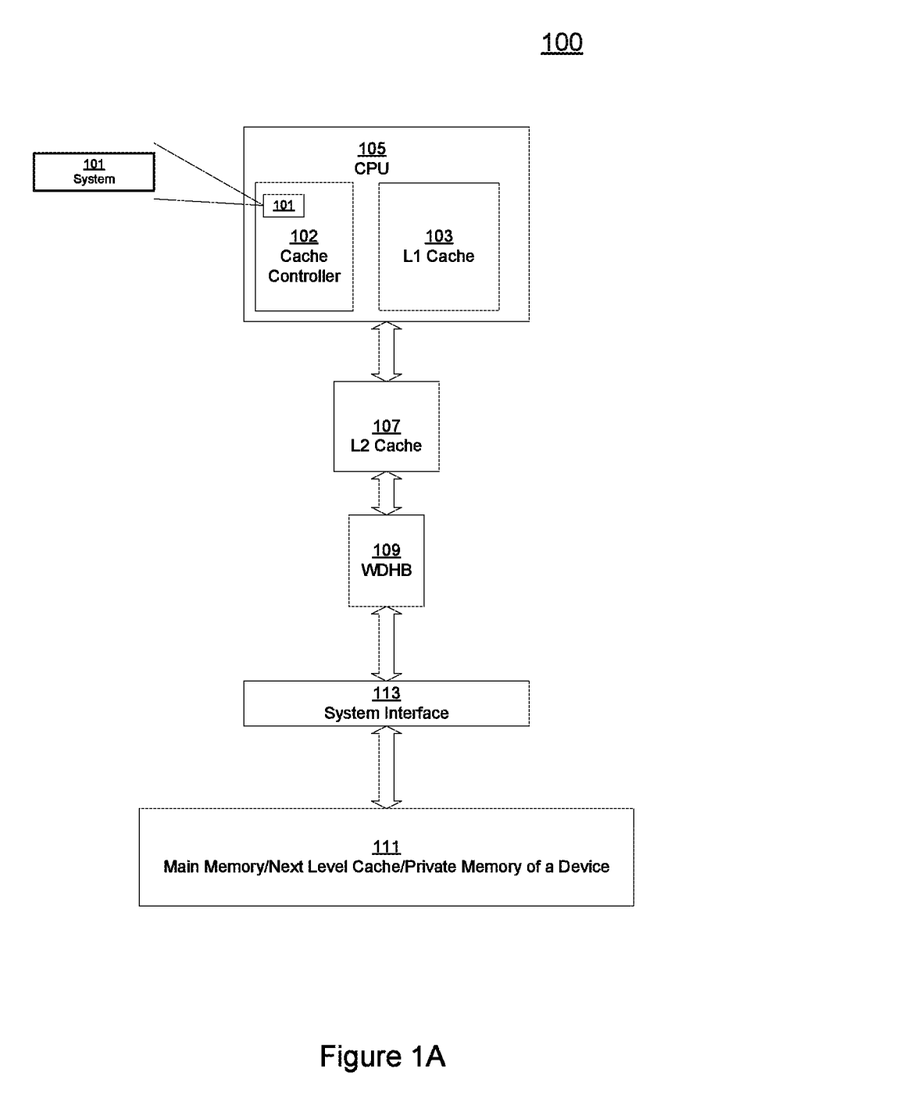
FIG. 1A shows an exemplary operating environment of a system for non-blocking implementation of cache flush instructions according to one embodiment.

Exemplary Operating Environment of a System for Non-Blocking Implementation of Cache Flush Instructions According to One Embodiment FIG. 1A shows an exemplary operating environment 100 of a system 101 for non-blocking implementation of cache flush instructions according to one embodiment. System 101 accesses data received by a writeback data holding buffer as a result of software initiated cache flushing operations, flags the data and notifies the cache that a write-back of the data to main memory/next level cache/private memory of device has completed before the write-back of the data to main memory/next level cache/private memory of device has actually completed. Subsequently, access to the write-back data holding buffer is provided to a serialization operation to determine if data that is then present in the write-back data holding buffer has been flagged. System 101 enables an efficient flushing of L2 cache, such that processor stalls, that are attributable to a necessity to wait for write-backs to main memory/next level cache/private memory of device to complete, before making L2 cache available for new/fresh data, are prevented. FIG. 1A shows system 101, cache controller 102, L1 cache 103, CPU 105, L2 cache 107, WDHB (write-back data holding buffer) 109, main memory/next level cache/private memory of device 111 and system interface 113.

Referring to FIG. 1A, L1 cache 103 is a level 1 cache and L2 cache 107 is a level 2 cache. In one embodiment, when a software based request is made to flush modified data from L2 cache 107, a copy of the modified data is written back to main memory/next level cache/private memory of device 111, replacing the old data located therein. In one embodiment, when a request to flush data from L2 cache 107 is made the data is flushed from L2 cache 107 into WDHB 109. In one embodiment, an indicator that the data has been flushed to main memory/next level cache/private memory of device 111 is provided to L2 cache 107 when the data is flushed into WDHB 109. The processor is then freed to receive new/fresh instructions that are needed by the software executing on the processor. In this manner, because requests to flush data typically involve blocking instructions, the blocking instruction is removed and the processor is not forced to wait until the write-back of the data to main memory/next level cache/private memory of device is actually completed before it can resume processing new requests. In conventional systems, it can take several hundred cycles for flushed data to reach main memory/next level cache/private memory of device 111. Accordingly, in exemplary embodiments, processor stalls that are attributable to such delays are avoided.

Figure 1B:
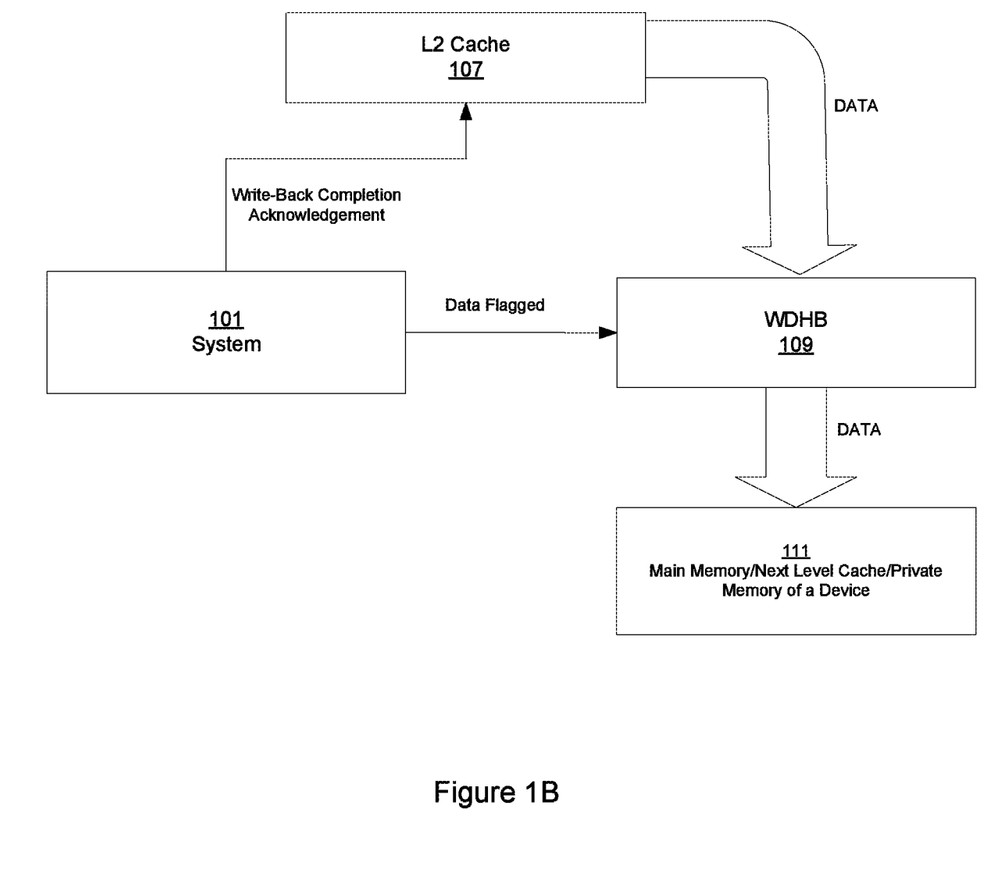
FIG. 1B shows how the data that is temporarily held in the data holding buffer is tagged and thereafter an indicator that the data has been completely flushed to a main memory/next level cache/private memory of a device is provided to L2 cache.

WDHB 109 receives data that is flushed from L2 cache 107 based on a software based request to flush the data to main memory/next level cache/private memory of device. WDHB 109 is a temporary data holding buffer that temporarily holds data that is in the process of being flushed from L2 cache 107 to main memory/next level cache/private memory of a device 111. In one embodiment, as shown in FIG. 1B, the flushed data that is temporarily held in WDHB 109 is flagged (e.g., with a processor identifier and a serialization flag). And, thereafter an indicator that the data has been completely flushed to main memory/next level cache/private memory of a device 111 is provided to L2 cache 107 (e.g., a write-back acknowledgement is provided to L2 cache 107 in response to the flagging and before the data is actually written back to main memory/next level cache/private memory of a device).

Figure 1C:
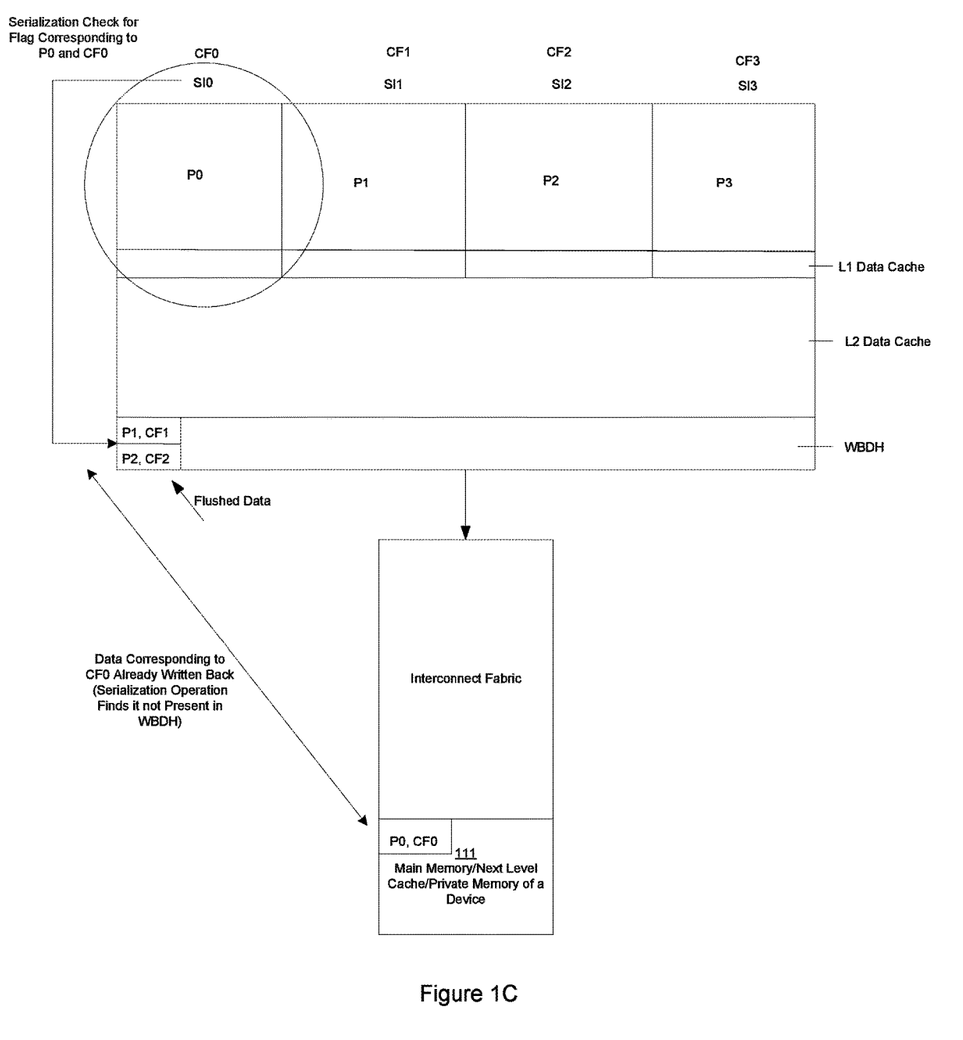
FIG. 1C illustrates how the flagging of data enables data associated with a specific processor core and a specific cache flush to be distinguished from other data that is associated with other processor cores and cache flushes that can be extant on a chip.

In one embodiment, as illustrated in FIG. 1C, the flagging enables data associated with a specific processor core (e.g., one of P0-P3) and a specific flush (e.g., one of CF0-CF3) to be distinguished from other data in WDHB 109 that is associated with other processor cores and flushes that can be extant on a chip. In this manner a serialization operation (e.g., one of SI0-SI3) can readily identify data held in WDHB 109 that is associated with a corresponding processor core and data flush request, and can operate to block the execution of subsequent instructions in the software that includes the serialization instruction, until the write-back of the identified data is completed. In one embodiment, because the execution of the instructions that are executed, after the flush request is executed, and before the serialization instruction is executed, can take many cycles, the data that is caused to be flushed by a flush request is typically already written back to main memory/next level cache/private memory of a device 111 at the point in time when the serialization instruction is executed (see flushed data P0, CF0 in FIG. 1C); the data that is temporarily held in WDHB 109 having been forwarded to main memory/next level cache/private memory of a device 111 when the forwarding of the data to main memory/next level cache/private memory of device is approved by the interconnect fabric.

Referring again to FIG. 1A, system 101 accesses data that is received by WDHB 109 as a result of a cache flushing operation (as illustrated in FIG. 1B). The data that is placed into WDHB 109 is flagged by system 101 with a processor identifier and a serialization flag (as illustrated in FIG. 1B). Prior to the completion of the flush of the data to main memory/next level cache/private memory of device and responsive to the flagging of the data, a cache completion indicator is provided by system 101 to L2 cache 107 (as illustrated in FIG. 1B). Subsequently, system 101 provides access to data held in WDHB 109 to determine if data that is then present therein is flagged (see above discussion). In one embodiment, system 101 can be located in cache controller 102. In other embodiments, system 101 can be separate from cache controller 102 but operate cooperatively therewith.

Main Memory/Next Level Cache/Private Memory of Device 111 stores data that is flushed from L2 cache 107 to main memory/next level cache/private memory of device 111 via WDHB 109. Having been placed into WDH B 109 to avoid blocking the ingress of data into L2 cache 107, data is moved to main memory/next level cache/private memory of device 111 when the interconnect fabric authorizes the forwarding of the data from WDHB 109. The data that is flushed to main memory/next level cache/private memory of device from L2 cache 107 updates the data that is stored in the involved address of main memory/next level cache/private memory of device 111. Also shown in FIG. 1A is system interface 113.

Operation

Figure 1D:
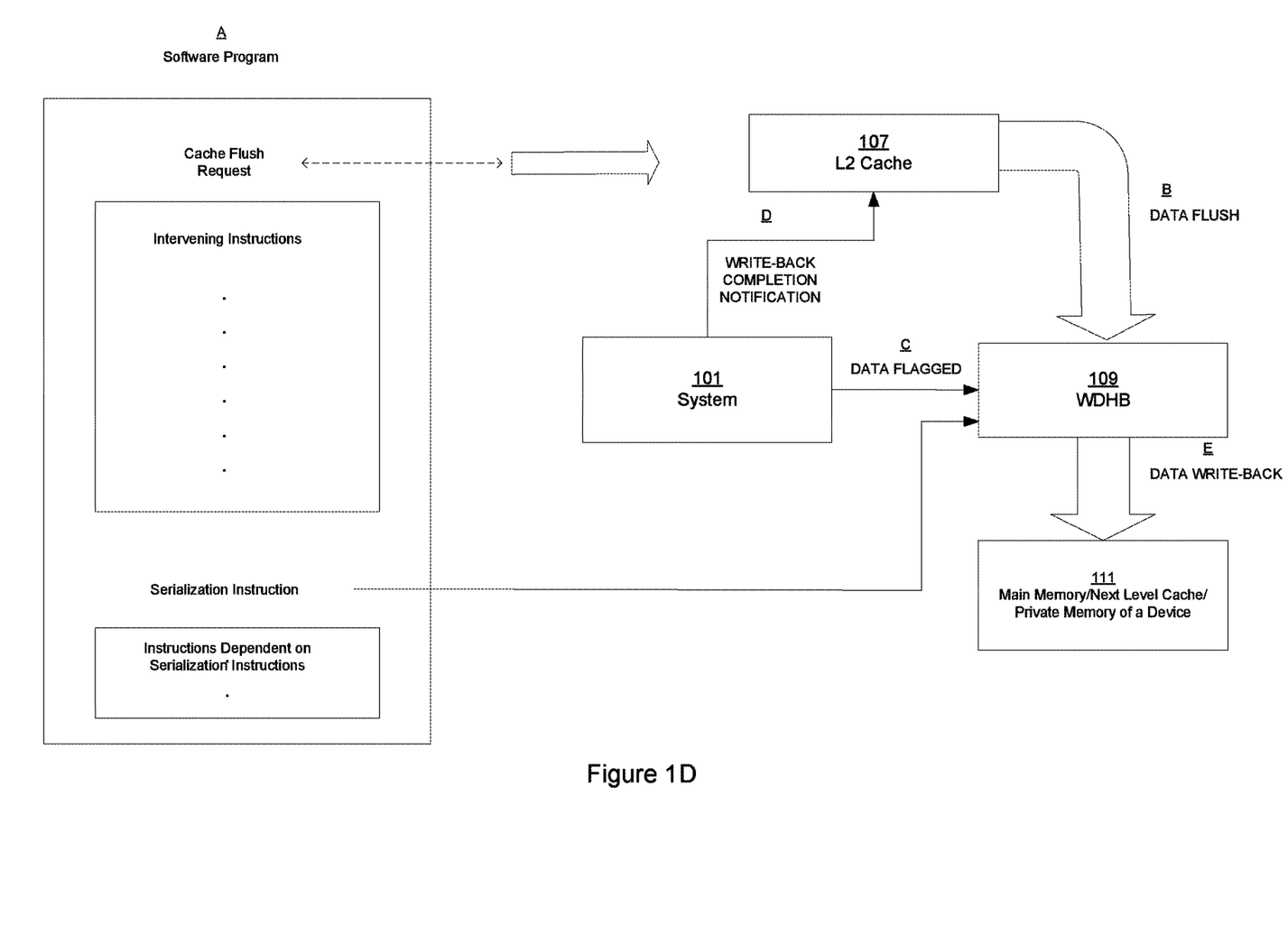
FIG. 1D illustrates operations performed by system for non-blocking implementation of cache flush instructions according to one embodiment.

FIG. 1D illustrates operations performed by system 101 for non-blocking implementation of cache flush instructions according to one embodiment. These operations, which relate to the implementation of cache flush instructions are illustrated for purposes of clarity and brevity. It should be appreciated that other operations not illustrated by FIG. 1D can be performed in accordance with one embodiment.

Referring to FIG. 1D, at A, a software based cache flush request is made. In one embodiment, the software based cache flush request is implemented as an instruction that is a part of the software. In one embodiment, the instruction causes the flushing of modified data from L2 cache 107 that is to be written back to main memory/next level cache/private memory of device 111.

At B, data is flushed from L2 cache 107 and forwarded to WDHB 109. In one embodiment, WDHB 109 has an 8 entry data holding capacity. In other embodiments, WDHB 109 can have other data holding capacities.

At C, system 101 accesses the data that is received by WDHB 109 and flags the data with a processor identifier and a serialization flag. In one embodiment, the processor identifier and the serialization flag refer to a specific processor and a specific cache flush.

At D, responsive to the flagging of the data, L2 cache 107 is notified that the cache flush has been completed (that the data has been written back to main memory/next level cache/private memory of device 111). In one embodiment, L2 cache 107 is notified that that the cache flush has been completed, in response to the flagging of the data and before the data is actually written-back to main memory/next level cache/private memory of device 111.

At E, the data that is flushed from L2 cache 107 is written-back to main memory/next level cache/private memory of device 111. At F, access to the contents of the write-back data holding buffer is provided to a serialization instruction in the software program that initiated the cache flush request. The serialization instruction ensures that the write-back of data is completed before subsequent instructions in the software program can be executed. The serialization operation uses the flags to identify data held in WDHB 109 that is associated with a specific processor core and data flush request, and blocks the execution of subsequent instructions, until the write-back of the identified data is completed.

Figure 2:
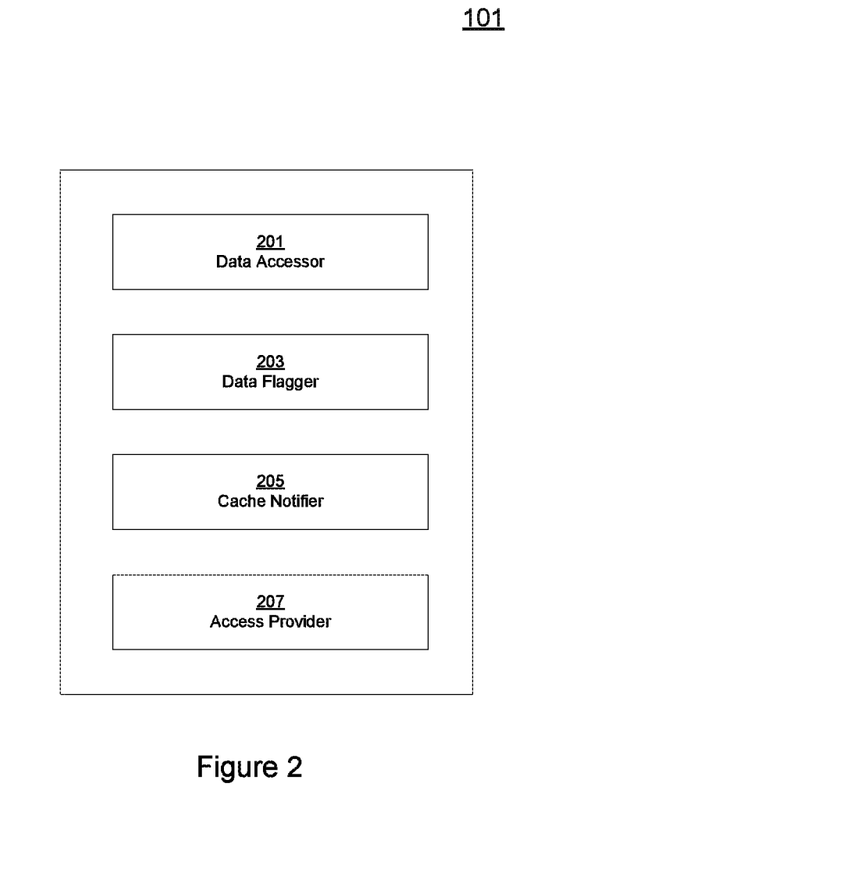
FIG. 2 shows components of a system for non-blocking implementation of cache flush instructions according to one embodiment.

Components of System for Non-Blocking
Implementation of Cache Flush Instructions
According to One Embodiment FIG. 2 shows components of a system 101 for non-blocking implementation of cache flush instructions according to one embodiment. In one embodiment, components of system 101 implement an algorithm for non-blocking implementation of cache flush instructions. In the FIG. 2 embodiment, components of system 101 include data accessor 201, data flagger 203, cache notifier 205 and access provider 207.

Referring to FIG. 2, data accessor 201 accesses data that is received by a write-back data holding buffer (e.g., WDHB 109 in FIG. 1A) as part of a cache flushing operation. In one embodiment, the data is that is received is received from L2 cache (e.g., 107 in FIG. 1A) en route to main memory/next level cache/private memory of device (e.g., 111 in FIG. 1A). In one embodiment, the write-back data holding buffer temporarily holds the data until the interconnect fabric indicates that the data that is being temporarily held in the write-back holding buffer can be forwarded onward.

Data flagger 203 flags the data that is flushed to the write-back data holding buffer with a processor identifier and a serialization flag. In one embodiment, the flagging enables data associated with a specific processor core and a specific flush to be identified from among other data associated with various other processor cores and flushes that are extant on a chip.

Cache notifier 205, responsive to the flagging, notifies L2 cache that a flush of the flagged data has been completed (e.g., that the data has been written back to main memory/next level cache/private memory of device). In one embodiment, the notification is provided to L2 cache prior to the completion of the flush of the flagged data to main memory/next level cache/private memory of device.

Access provider 207, after a cache flush completion notification is provided to the cache, provides access to the data that is then present in the write-back holding buffer, such that it can be determined if the data then present in the write-back data holding buffer is flagged. In one embodiment, access is provided to a serialization instruction, which determines if any of the data then present in the write-back data holding buffer is flagged.

It should be appreciated that the aforementioned components of system 101 can be implemented in hardware or software or in a combination of both. In one embodiment, components and operations of system 101 can be encompassed by components and operations of one or more computer components or operations (e.g., cache controller 102 in FIG. 1A). In another embodiment, components and operations of system 101 can be separate from the afore-

Figure 3:
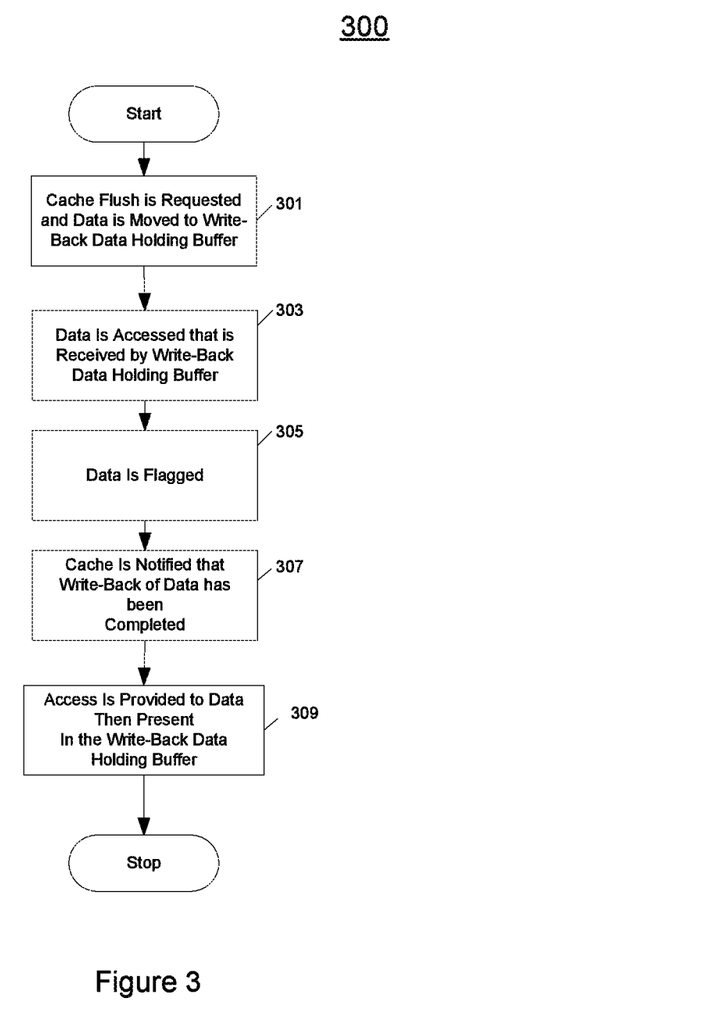
FIG. 3 shows a flowchart of the steps performed in a method for non-blocking implementation of cache flush instructions according to one embodiment.

Method for Non-Blocking Implementation of a Cache Flush Instruction According to One Embodiment FIG. 3 shows a flowchart 300 of the steps performed in a method for non-blocking implementation of cache flush instructions according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, a cache flush request is made and data is flushed to a write-back data holding buffer as a part of cache flushing operations. In one embodiment, the cache flush request is made by a software program that seeks to flush modified data from L2 cache.

At 303, data is accessed that is received by a write-back data holding buffer as a part of the cache flushing operation.

At 305, the flushed data is flagged with a processor identifier and a serialization flag. In one embodiment, as described herein, the flagging enables data associated with a specific processor core and a specific flush to be distinguished from among other data associated with various other processor cores and flushes that can be extant on a chip.

At 307, the L2 cache is notified that a write-back of the data to main memory/next level cache/private memory of device has been completed (that the flush of the data to main memory/next level cache/private memory of device is completed) prior to the actual completion of the write-back of the data to main memory/next level cache/private memory of device. In one embodiment, the cache is notified that a write-back of the data to main memory/next level cache/private memory of device has been completed in response to the flagging of the data.

At 309, subsequent to notifying the L2 cache that a write-back of the flagged data to main memory/next level cache/private memory of device has been completed, access is provided to data then present in the write-back holding buffer to determine if the data then present in the write-back data holding buffer has been flagged.

With regard to exemplary embodiments thereof, systems and methods for efficient cache flushing are disclosed. As a part of a method, data is accessed that is received in a write-back data holding buffer from a cache flushing operation, the data is flagged with a processor identifier and a serialization flag, and responsive to the flagging, the cache is notified that the cache flush is completed. Subsequent to the notifying, access is provided to data then present in the write-back data holding buffer to determine if data then present in the write-back data holding buffer is flagged.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for non-blocking implementation of a cache flushing operation by a cache controller, comprising:
   signaling a write-back data holding buffer to flag data flushed by a cache with an identifier for a processor that initiated the cache flushing operation to flush the data from the cache; and
   notifying the cache that the cache flushing operation is complete before the data is written back to a memory.

2. The method of claim 1, wherein the cache flushing operation is a software based cache flushing operation.

3. The method of claim 1, further comprising:
   enabling access to the data in the write-back holding buffer to enable a check for serialization flag by a serialization operation.

4. The method of claim 1, further comprising:
   signaling the write-back data holding buffer to flag the data flushed by the cache with a serialization flag.

5. The method of claim 4 wherein the serialization flag identifies a specific cache flushing operation associated with the processor identifier.

6. The method of claim 1, further comprising:
   over-writing the data in the cache after flushed from the cache and before the data is written back to the memory.

7. The method of claim 1, wherein the notifying is performed before an execution of a serialization instruction in software that initiated the cache flushing operation.

8. The method of claim 1 wherein the processor identifier identifies a specific processor core among a plurality of processor cores of the processor.

9. A method to support non-blocking implementation of a cache flushing operation by a write-back data holding buffer, the method comprising:
   receiving, by the write-back data holding buffer, data from a cache in response to the cache flushing operation;
   flagging data flushed by a cache with a serialization flag indicating a specific cache flush; and
   enabling access to an initiator of the cache flushing operation to check the serialization flag.

10. The method of claim 9, wherein the cache flushing operation is a software based cache flushing operation.

11. The method of claim 9, further comprising:
    receiving a processor identifier from a cache controller to associate with the data.

12. The method of claim 11 wherein the processor identifier identifies a specific processor core among a plurality of processor cores of the processor.

13. The method of claim 9, further comprising:
    over-writing the data in the cache after flushed from the cache and before the data is written back to a memory.

14. The method of claim 9, wherein the serialization flag identifies a specific cache flushing operation associated with a specific processor or processing core.

15. A device to support non-blocking cache flushing operations, the device comprising:
    a memory device for long term data storage;
    a processor to initiate a cache flushing operation;
    an interconnect to enable communication between the processor and memory device;
    a cache coupled to the processor to hold data;

a write-back data holding buffer (WDHB) coupled to the cache, the WDHB to hold the data in response to the cache flushing operation; and a cache controller coupled to the cache, the processor and the WDHB, the cache controller to signal a write-back data holding buffer to flag data flushed by the cache with an identifier for the processor, and to notify the cache that the cache flushing operation is complete before the data is written to the memory.

16. The device of claim 15, wherein the cache flushing operation is a software based cache flushing operation.

17. The device of claim 15, wherein the cache controller is configured to enable access to the data in the write-back holding buffer to enable a check for serialization flag by a serialization operation.

18. The device of claim 15, wherein the cache controller is configured to signal the write-back data holding buffer to flag the data flushed by the cache with a serialization flag.

19. The device of claim 18 wherein the serialization flag identifies a specific cache flushing operation associated with the processor identifier.

20. The device of claim 15, wherein the cache controller is configured to over-write the data in the cache after flushed from the cache and before the data is written back to the memory.

* * * * *